United States Patent Office 3,446,191
Patented May 27, 1969

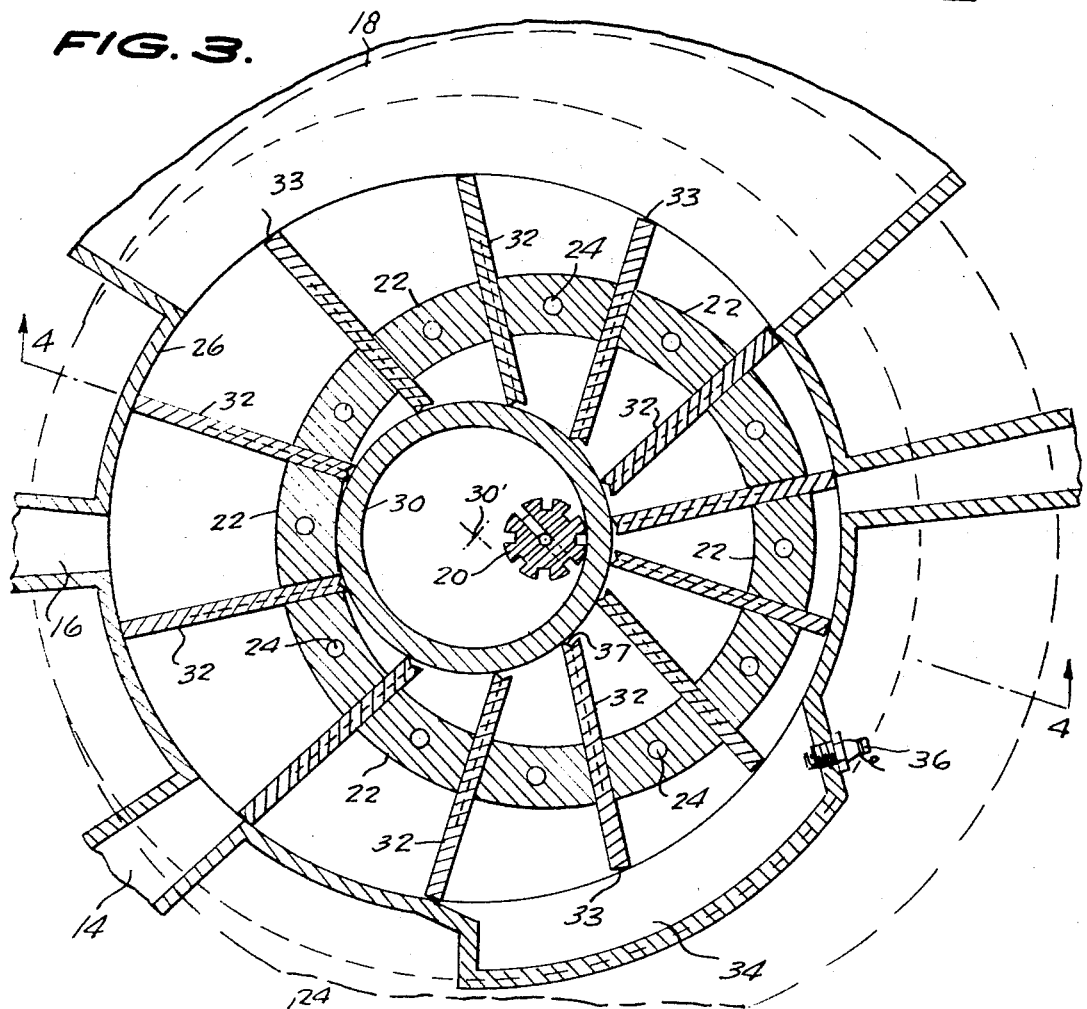
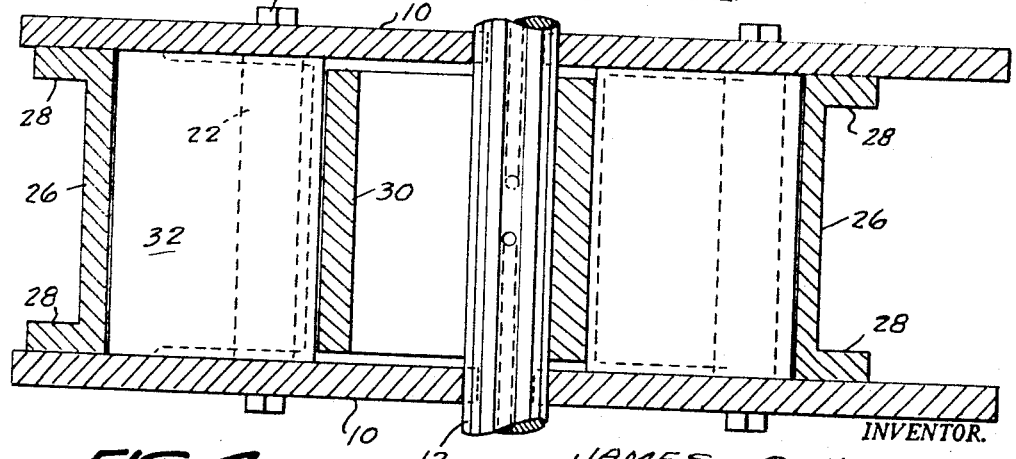

3,446,191
ROTARY COMBUSTION ENGINE
James C. Vernon, R.R. 1, Alexis, Ill. 61412
Filed July 7, 1967, Ser. No. 651,728
Int. Cl. F02b 53/00, 55/00
U.S. Cl. 123—16
6 Claims

ABSTRACT OF THE DISCLOSURE

A rotary internal combustion engine of the type having rotary, radically slidable blades defining consecutive chambers and characterized by having the inner ends of the blades bear on a ring which is freely rotatable about its own axis, said axis being spaced from the axis of rotation of said blades.

---

It is an object of this invention to provide a rotary internal combustion engine of a type having combustion chambers defined by rotary radial blades in which a plurality of blades are simultaneously accepting intake, firing, expanding and delivering to the exhaust so that the actual power development always involves a plurality of simultaneously acting chambers as defined by the blades.

It is a further object of this invention to provide in an engine as aforesaid an arrangement of blades about a freely rotatable disc or cylinder located eccentrically of the power shaft but itself not participating in eccentric movement.

It is a further object of this invention to provide in an engine as aforesaid an arrangement of parts providing a minimum of frictional wear with maximum lubrication.

The above and other objects will be made clear from the following detailed description taken in connection with the annexed drawings, in which:

FIGURE 3 is a section on the line 3—3 of FIGURE 2;

FIGURE 4 is a section on the line 4—4 of FIGURE 3; and

Figure 1:
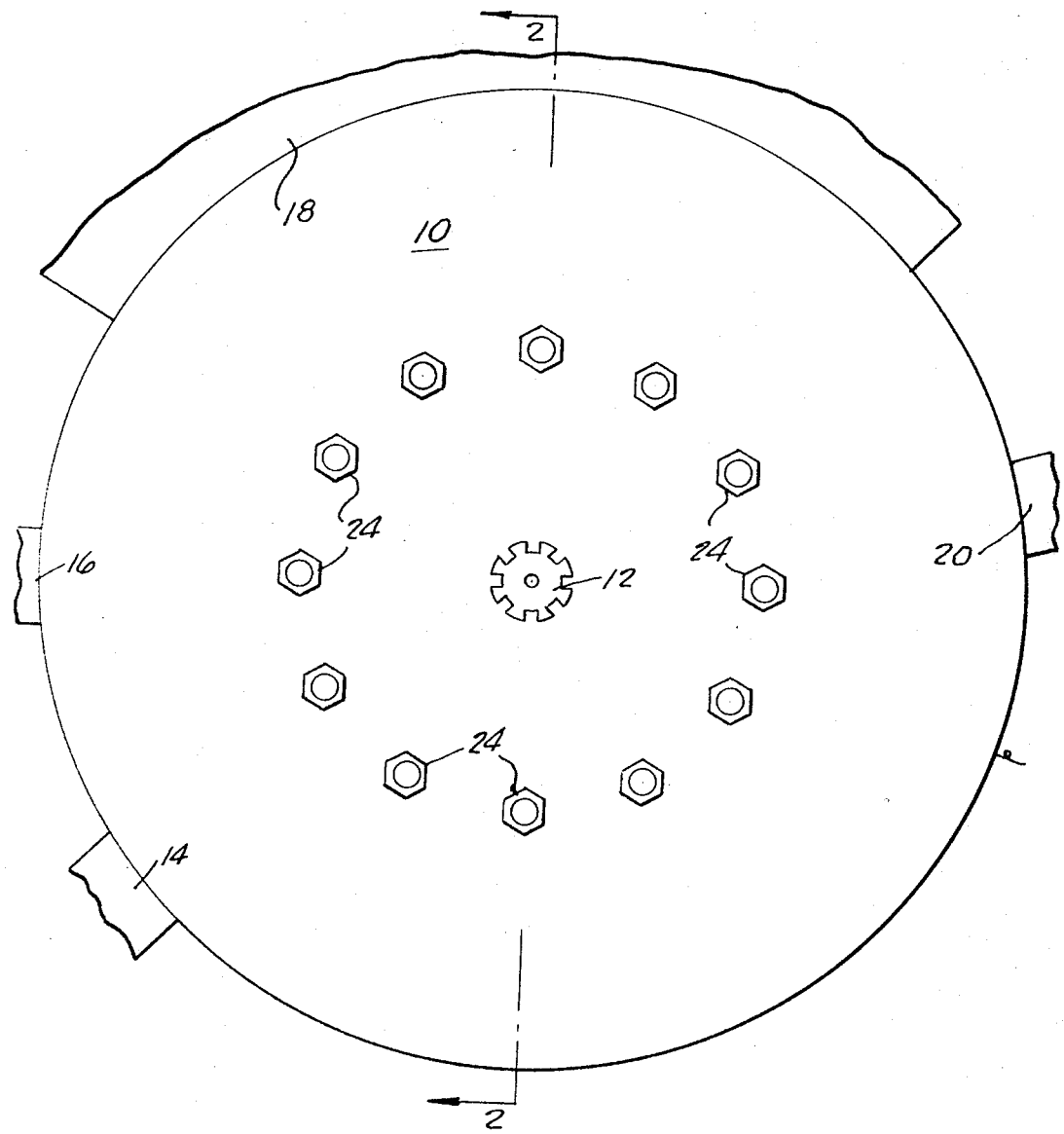
FIGURE 1 is an external side elevation of the improved engine.

Referring now to FIGURE 1, the engine presents a circular exterior side plate 10, splined to a shaft 12. The engine is provided with exhaust ports 14, 16 and 18, and an inlet port 20.

Figure 2:
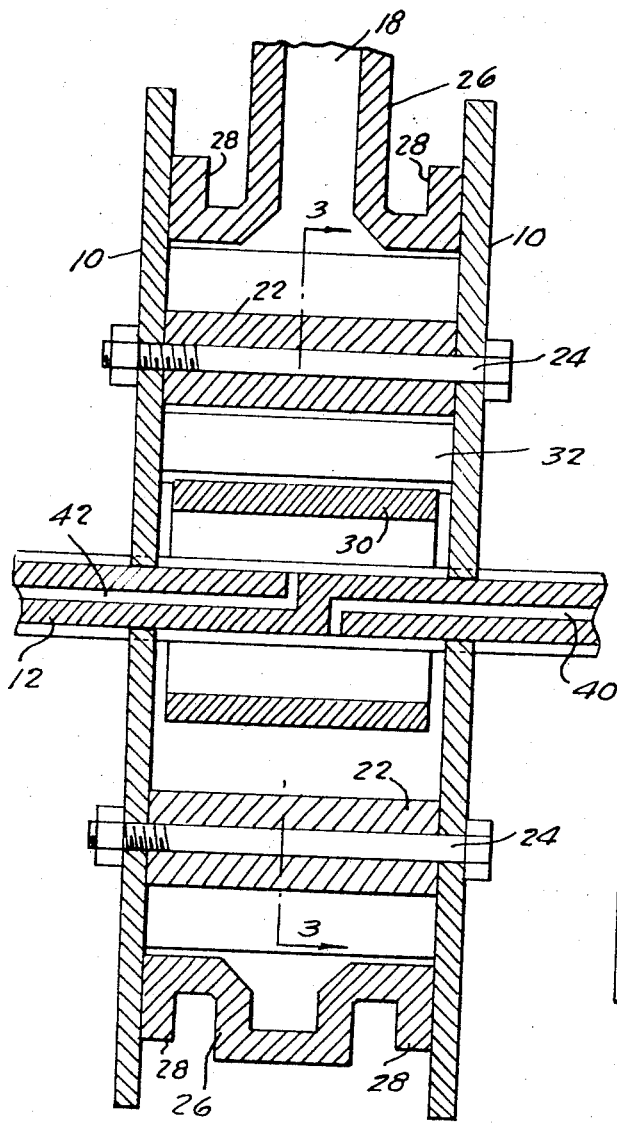
FIGURE 2 is a section taken on the line 2—2 of FIGURE 1.

Referring now to FIGURE 2, the side plates 10 are splined to the shaft 12 and separated by spacers 22, each joined to the side plates 10 by bolts 24. A stationary ring member 26 is placed between the spaced plates 10 and has flanges 28 in frictional engagement with the side plates 10. The exhaust ports and the inlet port are formed in the member 26 and in FIGURE 2 a portion of the exhaust port 18 is visible at the top of the figure. A freely rotating ring 30 surrounds the shaft 12 with its axis spaced from the axis of the shaft 12.

Referring now to FIGURE 3, it will be seen that the spacers 22 define radial channels in which mutually identical blades 32 are slidably mounted. The spacers 22 are bolted to side plates 10 which are splined to shaft 12 and consequently the blades 32 all rotate with and about the shaft 12. At their outer ends the blades 32 bear on the stationary casing 26 and at their inner ends on the free ring 30 which, of course, due to friction, will have motion of its own about its own axis 30'. A combustion chamber 34 is formed in the casing 26 and is equipped with a sparkplug or other ignition device 36. As viewed in FIGURE 3, the rotation of the parts is clockwise. There are twelve blades in all which means that at, say, 6,000 r.p.m., 1,200 blades per second will pass any given point in the casing 26. As each blade passes the inlet 20, the compartment between it and the next blade is charged with an air-fuel mixture (preferably under the impetus of a supercharger) and the charge in such compartment is ignited when the compartment reaches the sparkplug 36. At any one time, therefore, at least three charges are igniting and are pressing on the blade which has moved just past the combustion chamber 34 to engage the ring or frame 26.

The charge exhausts primarily at port 14, secondarily at port 16, and the balance of the exhaust discharges in the region of the port 20. The effect is not that of a conventional piston machine but rather represents a continuous burning and expansion system which, due to lack of eccentric motion, is remarkably smooth in operation even at exceedingly high r.p.m.

Figure 5:
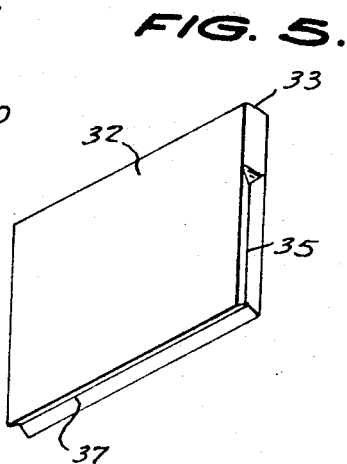
FIGURE 5 is a perspective detail of one of the blades.

As noted, FIGURE 5 is a perspective view detailing one of the blades 32. At its outer end 33, each blade 32 is square. The blade is grooved on each side part way of its length as at 35 and terminates in a V-shaped opening 37, the latter being made clear in FIGURE 3. The reason for squaring the ends 33 of the blades 32 is to assure some exposure of the ends 33 to the circumambient pressure. At the high r.p.m. at which machines of this class usually operate the centrifugal force exerted on the blades is enormous. Squaring the blade ends so as to submit these to gas pressure partly overcomes this centrifugal force and thereby lowers the friction between the blades and the ring member 26.

Optionally, as shown in FIGURES 2 and 4, the shaft 12 may be drilled as at 40 and 42 to provide a lubricating inlet and outlet for the interior of the rotor, with the lubricant also acting as a coolant. The grooves 35 and 37 of the blades 32 greatly assist in lubricating the blades. The grooves 37 in particular help to keep the blades in positive contact during low r.p.m., (as in starting) with the free ring 30, as shown in FIGURE 3.

The point that the ring 30 is freely rotatable on its own axis must be emphasized. This action serves to minimize friction between the inner ends of the blades 32 and the ring 30.

While certain specific details have been disclosed herein, numerous variations of these details doubtless will occur to those skilled in the art and it is not, therefore, intended to limit this invention to the precise details disclosed but only as set forth in the subjoined claims.

What is claimed is:

1. A rotary internal combustion engine comprising: a shaft; end plates secured to said shaft for rotation therewith; spacer elements secured between said end plates to form a wall concentric with said shaft, said spacer elements defining equally spaced channels directed radially of said shaft; blades slidably mounted in said channels, each of said blades having a solid, square outer end and a bifurcated inner end; a stationary ring mounted between said end plates, said ring having gas-tight, slidable engagement therewith and acting to guide the outer ends of said blades; a cylinder surrounding said shaft within the wall defined by said spacer members, said cylinder being freely rotatable about its own axis, said axis being parallel to and spaced from the axis of said shaft and the inner ends of said blades bearing on said cylinder.

2. An engine as set forth in claim 1, including inlet and exhaust ports formed in said stationary ring.

3. An engine as set forth in claim 2, including a plurality of circumferentially spaced exhaust ports.

4. An engine as set forth in claim 2, including a combustion chamber formed in said stationary ring between said inlet and exhaust ports.

5. An engine as set forth in claim 4, in which the circumferential extent of said combustion chamber encompasses a plurality of said blades.

6. An engine as set forth in claim 1, in which said stationary ring has annular flanges in sliding gas-tight engagement with said end plates.

References Cited

UNITED STATES PATENTS

| 1,006,063 | 10/1911 | Clarke. |
| 1,338,304 | 4/1920 | Jefferies. |
| 1,974,761 | 9/1934 | Vogel. |
| 2,104,517 | 1/1938 | Heerde. |

JULIUS E. WEST, *Primary Examiner.*